INVENTOR.
T. HUTSON, JR.
BY Hudson + Young
ATTORNEY'S

PONCHON DIAGRAM FOR PARA-XYLENE – NORMAL – NONANE – AQUEOUS NEOPENTYL GLYCOL (8 WT % WATER)

United States Patent Office 2,908,726
Patented Oct. 13, 1959

2,908,726

SOLVENT EXTRACTION WITH NEOPENTYL GLYCOL

Thomas Hutson, Jr., Phillips, Tex., assignor to Phillips Petroleum Company, a corporation of Delaware Application August 6, 1956, Serial No. 602,324

15 Claims. (Cl. 260—666)

This invention relates to the separation of the components of a hydrocarbon mixture. In one of its aspects, this invention relates to a selective solvent for separating mixtures into components of different chemical and physical properties, such as the separation of aromatic hydrocarbons from hydrocarbon mixtures containing the same and olefin, naphthene, and/or paraffin hydrocarbons. In another aspect, this invention relates to solvent extraction and extractive distillation processes for separating components of hydrocarbon mixtures.

In the various processes of converting hydrocarbons, there are frequently formed mixtures which contain some or all types of hydrocarbons, such as paraffins, cycloparaffins, olefins, and aromatic hydrocarbons such as can usually be separated by fractional distillation into close boiling fractions, but the further separation of such fractions to obtain reasonably pure hydrocarbons is often very difficult by conventional fractionation processes. Various methods have been prepared for effecting the separation of these hydrocarbons. Of these methods, the most practical from the viewpoint of large scale operations are those which involve contacting the mixture of hydrocarbons with a solvent which has a preferential solubility for one or more of the hydrocarbon components. As a consequence, the art is constantly in search of improved selective solvents which either show superior selectivity, are less expensive or are more readily separated from the hydrocarbon selectively removed.

The following are objects of this invention.

An object of this invention is to provide a method for separating the components of a hydrocarbon mixture. A further object of this invention is to provide a method for separating aromatic hydrocarbons from a mixture containing the same and olefin, naphthene, and/or paraffin hydrocarbons; for the separation of olefins from a mixture containing the same and naphthene, and/or paraffin hydrocarbons; and for the separation of naphthene from a mixture containing the same and/or paraffin hydrocarbons. A further object of this invention is to provide a new selective solvent for the above-mentioned separation.

Other objects, advantages and features of this invention will be apparent to those skilled in the art having been given this disclosure.

Figure 1:
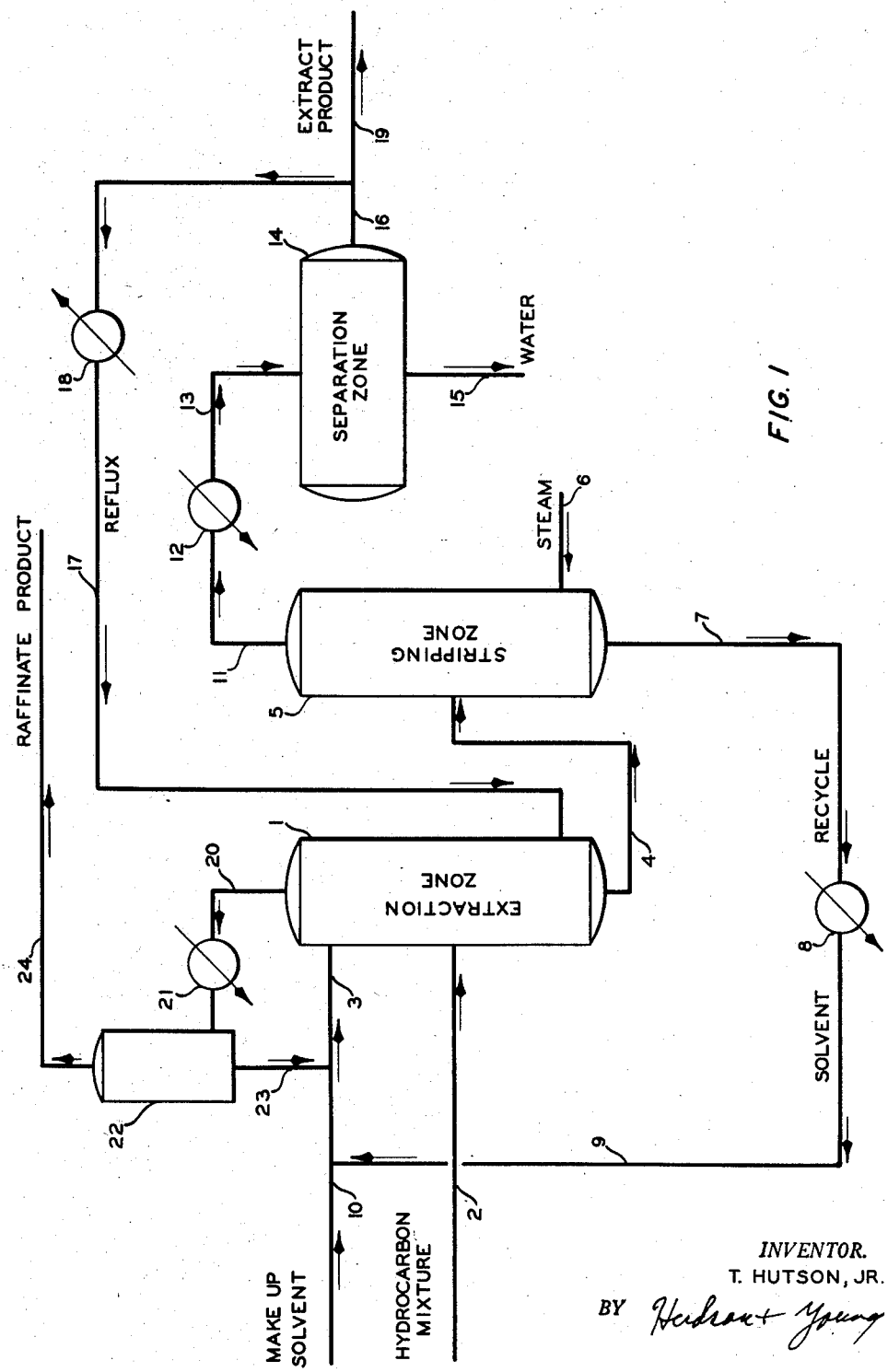
Figure 2:
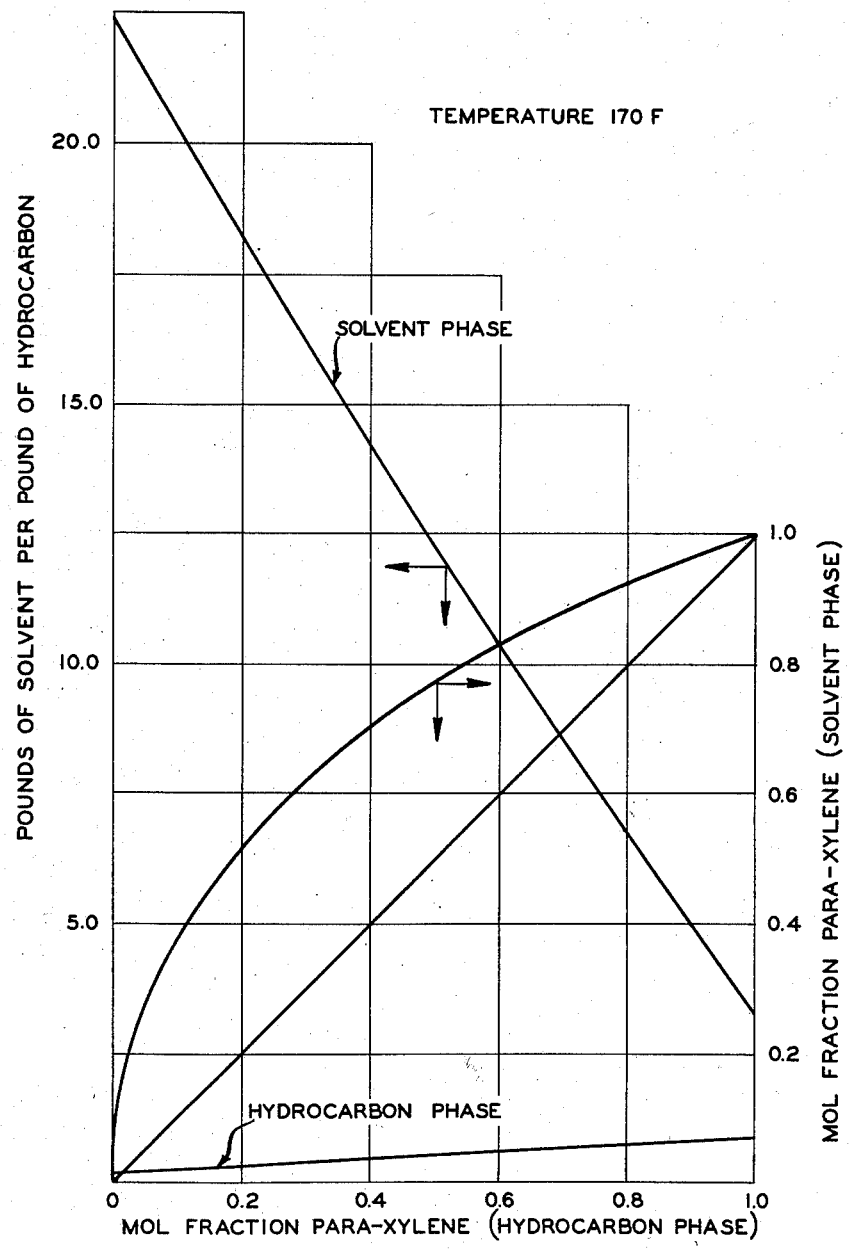

Accompanying and forming a part of this application are two drawings of which:

Figure 1 is a block flow diagram schematically illustrating one method of operation using the selective solvent of my invention; and Figure 2 is a graph showing the effectiveness of the separation for one particular separation.

According to my invention, a mixture of hydrocarbons is contacted with an aqueous neopentyl glycol containing 2 to 20 weight percent water to effect separation.

I have discovered that aqueous neopentyl glycol is selective for hydrocarbons in the order of aromatic, olefinic, naphthenic and paraffinic and, broadly, can be used for separation of one or more higher in order from those below.

Neopentyl glycol has a structural formula as

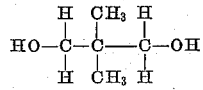

The 96 weight percent neopentyl glycol available commercially is a white crystalline solid and has a melting point in the range of 110 to 127° C. and a boiling point in the range of 205 to 208° C./760 mm. When using this material as a selective solvent, the percent water will generally be in the range of 5 to 20 weight percent. As a solvent, the material must be at a temperature at which it is in the liquid state and will generally be used in the range between 150 to 200° F.; however, lower temperatures can be used as can higher temperatures be used under pressure conditions to maintain the solvent in the liquid state and to also maintain the hydrocarbon components in liquid state. The process of my invention comprises contacting the hydrocarbon mixture with aqueous neopentyl glycol, as a solvent, in a contacting zone under such conditions of temperature and pressure that specific hydrocarbon components of the hydrocarbon mixture are dissolved in the solvent from which they can be recovered by subsequent treatment. In general, the ratio of solvent to hydrocarbon mixture will be in the range of 1 to 25 volume parts solvent per part of hydrocarbon mixture and preferably within the range of 7 to 15 parts solvent per part hydrocarbon mixture.

Hydrocarbon charging stocks or feed mixtures adapted to be processed in accordance with the present invention are of wide variety, obtainable from many different sources. In general, however, they are essentially complex liquid mixtures or solutions of hydrocarbons, both aromatic and non-aromatic, the latter usually including naphthenes and olefins as well as paraffins. Examples of suitable stocks are gasoline, kerosene, burning oils or similar fractions derived from crude petroleum. These fractions may be either straight run or cracked products or products of other refining operations such as reforming particularly catalytic reforming. Aromatic hydrocarbons, as used herein, include benzene and derivatives thereof such as ethylbenzene, toluene, xylenes, and the like, as well as polynuclear hydrocarbons. Olefins include hydrocarbons containing the carbon-to-carbon double bond; the paraffins include the saturated aliphatic hydrocarbons liquid at the treating temperature and pressure; and the naphthenes include the saturated alicyclic hydrocarbons liquid at the treating temperature and pressures. For example, I have found this solvent particularly useful for separating paraffins from either aromatics or from naphthenes, e.g., n-nonane from p-xylene and n-heptane from cyclohexane, benzene from cyclohexane, benzene from n-heptane, benzene from normal hexane, cyclohexane from branched heptanes, methylcyclohexane from n-heptane, heptene-1 from n-heptane, etc. In using extractive distillation methods, the following separations are readily made: butadiene-1,3 from butene-1, benzene from n-hexane, cyclohexane from branched heptanes, etc.

The operation of this invention will be further described with reference to Figure 1. The hydrocarbon mixture to be resolved is introduced at an intermediate point of extraction in zone 1 via conduit 2. The solvent, neopentyl glycol, enters the extraction zone near the top via conduit 3. The solvent rich in extracted hydrocarbon passes from extraction zone 1 via conduit 4 to stripping zone 5 wherein the solvent and hydrocarbon are separated by means of steam supplied via conduit 6. The solvent is removed from zone 5 via conduit 7 to cooler 8 wherein the temperature is lowered to the desired operating temperature of the extraction zone 1. The thus cooled solvent is then recycled via conduit 9 to conduit 3, supra. Conduit 10 is provided to add make-up solvent to the system. The steam takes the extract hydrocarbon overhead from stripping zone 5 via conduit 11 to condenser 12 wherein the steam and hydrocarbon are condensed. These condensed products then flow via conduit 13 to phase separation zone 14. The hydrocarbon and water form two liquid phases in separation zone 14 and water is removed via conduit 15. The hydrocarbon extract product is removed via conduit 16 and a portion is recycled via conduit 17 and heater 18 back to extract zone 1 as reflux. By use of reflux, the amount of the less soluble material in the extract is reduced to a minimum. The remaining extract product passes via conduit 19 to product storage, not shown. The less soluble component or components pass overhead from extraction zone 1 as raffinate via conduit 20 and cooler 21 to surge tank 22. A portion of the raffinate is recycled via conduits 23 and 3 as reflux to extraction zone 1. This reflux minimizes the amount of the more soluble components passing overhead. The raffinate product passes to storage, not shown, via conduit 24.

*Specific embodiments*

One hundred pounds per hour of a hydrocarbon mixture consisting of 50 percent para-xylene and 50 percent n-nonane is fed to a 10 stage extractor such as extractor 1 via conduit 2. This extractor is maintained at 170° F. and under 15 p.s.i.g. pressure. At the same time, 891 pounds per hour of neopentyl glycol (8 percent water) enters the extractor via conduit 3. The extract phase then passes via conduit 4 to the stripping zone 5 which has a pressure of about 1 p.s.i.g. and operates with a bottom temperature of 240° F. and a top temperature of 190° F. Steam is admitted via conduit 6 at a rate sufficient to maintain the operating conditions and to separate the hydrocarbon from the aqueous neopentyl glycol. This rate will be about 1485 pounds steam per hour. The aqueous neopentyl glycol (891 pounds per hour) is recycled via conduits 7, 9 and 3. The steam and hydrocarbon pass overhead from the stripper 5 via conduit 11 to condenser 12 wherein the vapors are liquefied. The liquids are then passed to separator 14 wherein the hydrocarbon and water are separated. The water is removed via conduit 15 and the hydrocarbon, 98 percent p-xylene, is removed via conduit 16. 50 pounds per hour of this p-xylene is sent to product storage via conduit 19 and 197.5 pounds per hour is recycled via conduit 17. Raffinate, 98 percent n-nonane, passes overhead from the extractor 1 via conduit 20 and after cooling is divided into reflux and product. The reflux rate is sufficient to saturate the solvent or about 50 pounds per hour and the product rate is 50 pounds per hour of 98 percent n-nonane.

A Ponchon diagram for para-xylene-normal nonane-aqueous neopentyl glycol (8 percent water) is shown in Figure 2. An examination of this diagram shows that these two compounds are readily separable by aqueous neopentyl glycol.

Phase equilibrium data for aqueous neopentyl glycol (8 weight percent water)-para-xylene-n-nonane at 170° F. are given in the following table.

HYDROCARBON PHASE

| Run | Refractive Index | Specific Gravity, 20/4° C. | Weight Percent Para-xylene | Ratio Solvent to Hydrocarbon |
|---|---|---|---|---|
| 1 | 1.4056 | 0.7183 | 0.0 | 0.1075 |
| 2 | 1.4212 | 0.7412 | 16.8 | |
| 3 | 1.4376 | 0.7684 | 35.9 | 0.222 |
| 4 | 0.4562 | 0.7992 | 57.6 | 0.1021 |
| 5 | 1.4944 | | 99+ | 0.954 |

SOLVENT PHASE

| | | | | |
|---|---|---|---|---|
| 1 | 1.4080 | | 0.0 | 22.4 |
| 2 | 1.4443 | 0.7818 | 44.6 | 21.15 |
| 3 | 1.4650 | 0.8138 | 67.5 | 9.22 |
| 4 | 1.4766 | 0.8333 | 80.6 | 6.25 |
| 5 | 1.4949 | 0.8611 | 99+ | 3.33 |
| n-nonane | 1.4067 | 0.7181 | 99+ (n-nonane) | |
| p-xylene | 1.4926 | 0.8614 | 99+ | |

This equilibrium data again shows the effectiveness of aqueous neopentyl glycol as a selective solvent.

A run was made to determine the solubility of normal nonane and of paraxylene in aqueous neopentyl glycol (16.7 liquid volume percent water) at 170° F. The following data were obtained:

Component:     Solubility, liquid vol. percent
    n-Nonane _____ 1.39
    p-Xylene _____ 16.67

The above data clearly show the selectivity of the neopentyl glycol for the aromatic over the paraffin.

Runs were made to compare the solubility of n-nonane and para-xylene in aqueous neopentyl glycol with the solubility of these materials in triethylene glycol (TEG). The results are shown in the following table.

| Solvent | Temperature, ° F. | Solubility of n-nonane, Wt. percent | Solubility of p-xylene, Wt. percent |
|---|---|---|---|
| Neopentyl glycol plus 15 wt. percent water | 170 | 0.9 | 13.5 |
| Neopentyl glycol plus 8 wt. percent water | 170 | 4.3 | 23.1 |
| TEG plus 7 wt. percent water | 170 | 0.7 | 10.0 |
| TEG plus 7 wt. percent water | 305 | 2.0 | 23.0 |

From the above data, it can be seen that at the same temperature, 170° F., the neopentyl glycol has much higher solubility for the p-xylene than does the triethylene glycol.

This invention has been described in one of its embodiments. Those skilled in the art will see many modifications which can be made and still obtain the advantages thereof. For example stripping means other than steam stripping can be employed, different extractor equipment can be employed, for example, extractors containing bubble trays, Raschig rings, Berl saddles and the like, different refluxing ratio and the like are operable, etc. It will be apparent to those skilled in the art that extractive distillation processes can also be employed using the solvent of this invention. Such processes are well known in the art and need no discussion here. It should also be understood that the particular separation described is illustrative only and other separations and different neopentyl glycol water ratios can be employed, all of which is understood by those skilled in the art.

I claim:

1. In the separation of an aromatic hydrocarbon from a mixture of same and at least one member selected from the group consisting of olefinic, naphthenic and paraffinic hydrocarbons, the step of treating the mixture with a selective solvent consisting essentially of neopentyl glycol associated with from 2 to 20 weight percent water.

2. In the separation of an olefinic hydrocarbon from a mixture of same and at least one of a naphthenic and a paraffinic hydrocarbon, the step of treating the mixture with a selective solvent consisting essentially of neopentyl glycol associated with from 2 to 20 weight percent water.

3. In the separation of a naphthenic hydrocarbon from a mixture of same and a paraffinic hydrocarbon, the step of treating the mixture with a selective solvent consisting essentially of neopentyl glycol associated with from 2 to 20 weight percent water.

4. In the separation of an aromatic hydrocarbon from a mixture of same and at least one of an olefinic, a naphthenic, and a paraffinic hydrocarbon, the step of treating the mixture with 1 to 25 volumes of a selective solvent per volume of said mixture at a temperature at which said solvent is in liquid state and under sufficient pressure to maintain the components in liquid phase, said selective solvent consisting essentially of neopentyl glycol associated with 2 to 20 weight percent water.

5. A process for the separation of a mixture of hydrocarbons containing at least two members selected from the group consisting of aromatic, olefinic, naphthenic and paraffinic hydrocarbons into components of different physical and chemical properties comprising introducing the hydrocarbon mixture into the central portion of a contacting zone; introducing a selective solvent consisting essentially of neopentyl glycol associated with from 2 to 20 weight percent of water into the upper portion of said zone; withdrawing the major portion of at least one member selected from the group consisting of olefinic, naphthenic and paraffinic hydrocarbons from the upper end portion of said zone; withdrawing a mixture of said selective solvent and the major portion of at least one member selected from the group consisting of aromatic, olefinic and naphthenic hydrocarbons from the lower end portion of said zone; passing said last named mixture to a separation zone; separating aqueous neopentyl glycol associated with from 2 to 20 weight percent water from said last named mixture; recycling at least a portion of said aqueous neopentyl glycol to said contacting zone; and withdrawing a stream rich in at least one member selected from the group consisting of aromatic, olefinic, and naphthenic hydrocarbons from said separation zone.

6. The process of claim 5 wherein said aqueous neopentyl glycol is separated from said mixture of aqueous neopentyl glycol and at least one member selected from the group consisting of aromatic, olefinic, naphthenic hydrocarbons by distillation.

7. In the separation and recovery of para-xylene from a mixture of para-xylene and normal nonane, the step of treating said mixture with a selective solvent consisting of neopentyl glycol associated with from 2 to 20 weight percent water.

8. In the separation and recovery of cyclohexane from a mixture of cyclohexane and branched heptanes, the step of treating said mixture with a selective solvent consisting essentially of neopentyl glycol associated with from 2 to 20 weight percent water.

9. In the separation and recovery of heptene-1 from a mixture of heptene-1 and n-heptane, the step of treating said mixture with a selective solvent consisting essentially of neopentyl glycol associated with from 2 to 20 weight percent water.

10. In the separation and recovery of benzene from a mixture of benzene and n-hexane, the step of treating said mixture with a selective solvent consisting of essentially neopentyl glycol associated with from 2 to 20 weight percent water.

11. In the separation and recovery of methylcyclohexane from a mixture of methylcyclohexane and n-heptane, the step of treating said mixture with a selective solvent consisting essentially of neopentyl glycol associated with from 2 to 20 weight percent water.

12. In the separation of a mixture of hydrocarbons comprising at least two members of the group consisting of aromatics, olefins, naphthenes and paraffins into two fractions, each containing a higher percentage of hydrocarbons of a different member of said group than did said mixture, the step of contacting the mixture with a selective solvent consisting essentially of aqueous neopentyl glycol associated with from 2 to 20 weight percent water.

13. In the separation of a mixture of hydrocarbons comprising at least two hydrocarbons selected from the group consisting of aromatics, olefins, naphthenes and paraffins into two fractions each being enriched with one of the said selected hydrocarbons, the step of contacting the mixture with 1 to 25 volumes of a selective solvent per volume of said mixture at a temperature in the range 150 to 200° F., said selective solvent consisting essentially of neopentyl glycol associated with 2 to 20 weight percent water.

14. The separation of claim 12 wherein said separation is carried out by means of solvent extraction.

15. The separation of claim 12 wherein said separation is carried out by means of extractive distillation.

References Cited in the file of this patent

UNITED STATES PATENTS

| | | |
|---|---|---|
| 2,295,612 | Soday | Sept. 15, 1942 |
| 2,444,582 | Smith | July 6, 1948 |
| 2,766,300 | Weedman | Oct. 9, 1956 |
| 2,773,919 | Millikan | Dec. 11, 1956 |
| 2,778,858 | Meinhofer | Jan. 22, 1957 |
| 2,794,839 | Broughton | June 4, 1957 |